United States Patent
Durden et al.

(10) Patent No.: US 7,140,033 B1
(45) Date of Patent: Nov. 21, 2006

(54) METHODS AND SYSTEMS FOR CONTROLLING CONSUMER ELECTRONICS EXTERNAL DEVICES VIA DATA DELIVERED TO A DEVICE

(75) Inventors: George A. Durden, Alpharetta, GA (US); John R. Stefanik, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 1099 days.

(21) Appl. No.: 09/752,267

(22) Filed: Dec. 29, 2000

Related U.S. Application Data

(60) Provisional application No. 60/231,180, filed on Sep. 7, 2000, provisional application No. 60/214,529, filed on Jun. 27, 2000, provisional application No. 60/213,058, filed on Jun. 21, 2000.

(51) Int. Cl.
*H04N 3/00* (2006.01)
*H04N 13/00* (2006.01)
*H04N 7/16* (2006.01)

(52) U.S. Cl. .......................... 725/80; 725/39; 725/28; 725/139

(58) Field of Classification Search ............ 725/37–61, 725/80, 85, 24–31, 110, 105, 74, 141, 153, 725/54, 39, 133, 136
See application file for complete search history.

(56) References Cited

U.S. PATENT DOCUMENTS

| 4,930,158 A | 5/1990 | Vogel |
| 4,930,160 A | 5/1990 | Vogel |
| 5,191,645 A | 3/1993 | Carlucci et al. |
| 5,195,135 A | 3/1993 | Palmer ........................ 380/20 |
| 5,398,070 A | 3/1995 | Lee ............................ 348/553 |
| 5,481,296 A | 1/1996 | Cragun et al. |
| 5,485,518 A | 1/1996 | Hunter et al. |
| 5,534,913 A | 7/1996 | Majeti et al. .................. 348/7 |
| 5,559,949 A | 9/1996 | Reimer et al. |
| 5,619,251 A | 4/1997 | Kuroiwa et al. |

(Continued)

FOREIGN PATENT DOCUMENTS

EP   0 508 939   10/1992

(Continued)

OTHER PUBLICATIONS

Kate, Ten W.: "Trigg & Link A New Dimension in Television Program Making," Proceedings of the European Conference on Multimedia Applications, Services and Techniques, May 1997, pp. 51-65.

*Primary Examiner*—Chris Kelley
*Assistant Examiner*—Johnny Ma
(74) *Attorney, Agent, or Firm*—Walters & Zimmerman, PLLC; Geoff Sutcliffe; Todd Mitchem

(57) ABSTRACT

This document discloses systems and methods for enabling viewers to control and manage programming and to control external consumer electronic devices through the use of a STB or other device. This invention provides command information that is embedded into an EPG signal and transmitted from a headend or transmission facility through a distribution network to the end user. By way of example, the program data includes volume, lighting, internet or environmental tag information for controlling external devices, such as a surround sound entertainment system, home environment system, personal computer, etc. A set top box or other properly configured consumer electronics device either receives data from the external device to effect programming or transmits data to the external device to optimize the viewing experience or to supplement information produced by the EPG.

20 Claims, 7 Drawing Sheets

U.S. PATENT DOCUMENTS

| | | | |
|---|---|---|---|
| 5,668,591 A | 9/1997 | Shintani | 348/12 |
| 5,671,267 A | 9/1997 | August et al. | 379/61 |
| 5,699,107 A | 12/1997 | Lawler et al. | |
| 5,737,552 A | 4/1998 | Lavallee et al. | |
| 5,774,170 A | 6/1998 | Hite et al. | |
| 5,778,135 A | 7/1998 | Ottesen et al. | |
| 5,793,438 A | 8/1998 | Bedard | |
| 5,801,747 A | 9/1998 | Bedard | 348/1 |
| 5,812,123 A | 9/1998 | Rowe et al. | |
| 5,818,935 A | 10/1998 | Maa | 380/20 |
| 5,828,402 A | 10/1998 | Collings | |
| 5,850,218 A | 12/1998 | LaJoie et al. | |
| 5,917,481 A * | 6/1999 | Rzeszewski et al. | 715/721 |
| 5,949,471 A | 9/1999 | Yuen et al. | 348/5.5 |
| 5,973,683 A | 10/1999 | Cragun et al. | |
| 5,982,363 A | 11/1999 | Naiff | 345/327 |
| 6,008,802 A * | 12/1999 | Iki et al. | 715/721 |
| 6,009,433 A | 12/1999 | Kurano et al. | |
| 6,016,141 A | 1/2000 | Knudson et al. | |
| 6,023,267 A | 2/2000 | Chapuis et al. | |
| 6,025,869 A | 2/2000 | Stas | 348/5.5 |
| 6,046,760 A | 4/2000 | Jun | 348/7 |
| 6,057,872 A | 5/2000 | Candelore | |
| 6,104,423 A * | 8/2000 | Elam | 725/28 |
| 6,240,555 B1 * | 5/2001 | Shoff et al. | 725/110 |
| 6,249,320 B1 | 6/2001 | Schneidewend et al. | |
| 6,263,505 B1 * | 7/2001 | Walker et al. | 725/110 |
| 6,314,572 B1 | 11/2001 | LaRocca et al. | |
| 6,326,982 B1 * | 12/2001 | Wu et al. | 715/718 |
| 6,463,207 B1 | 10/2002 | Abecassis | |
| 6,519,770 B1 | 2/2003 | Ford | |
| 6,571,392 B1 * | 5/2003 | Zigmond et al. | 725/110 |
| 6,597,405 B1 * | 7/2003 | Iggulden | 348/553 |
| 6,601,103 B1 * | 7/2003 | Goldschmidt Iki et al. | 709/231 |
| 6,604,240 B1 | 8/2003 | Ellis et al. | |
| 6,675,384 B1 | 1/2004 | Block et al. | |
| 6,732,367 B1 | 5/2004 | Ellis et al. | |
| 2002/0056129 A1 * | 5/2002 | Blackketter et al. | 725/112 |
| 2002/0073424 A1 * | 6/2002 | Ward et al. | 725/42 |
| 2003/0131356 A1 * | 7/2003 | Proehl et al. | 725/58 |

FOREIGN PATENT DOCUMENTS

| | | |
|---|---|---|
| EP | 0 952 734 | 10/1999 |
| WO | WO 97/13368 | 4/1997 |
| WO | WO 98/16062 | 4/1998 |
| WO | WO 98/47286 | 10/1998 |
| WO | WO 99/04561 | 1/1999 |
| WO | WO 00/20976 | 4/2000 |

* cited by examiner

Figure 2A: IR Interface
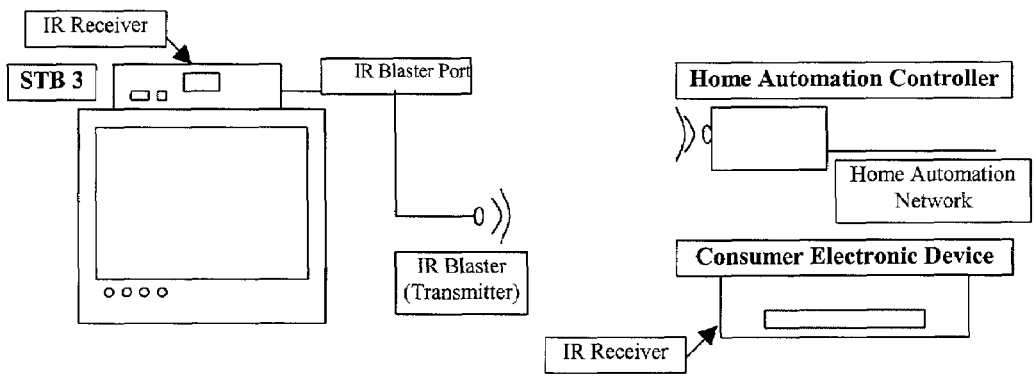
Figure 2B: RS-232 Serial Interface
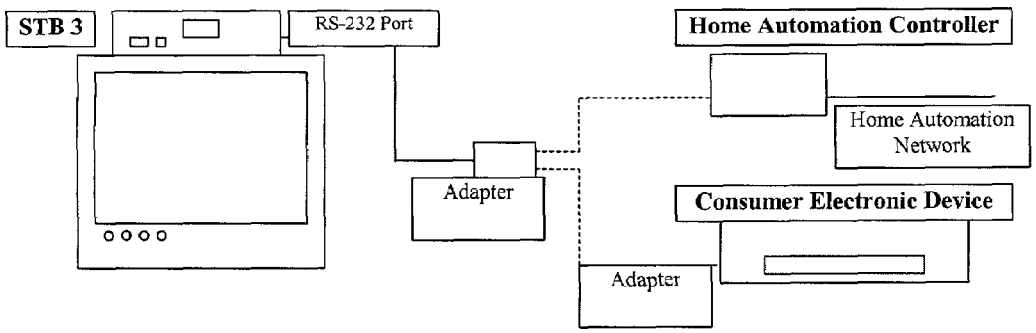
Figure 2C: Expansion Bus Interface
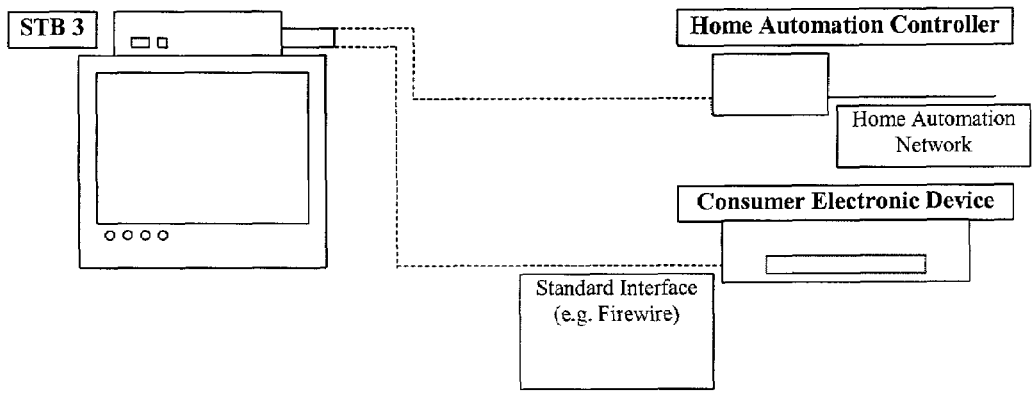

Figure 4A: IR Interface
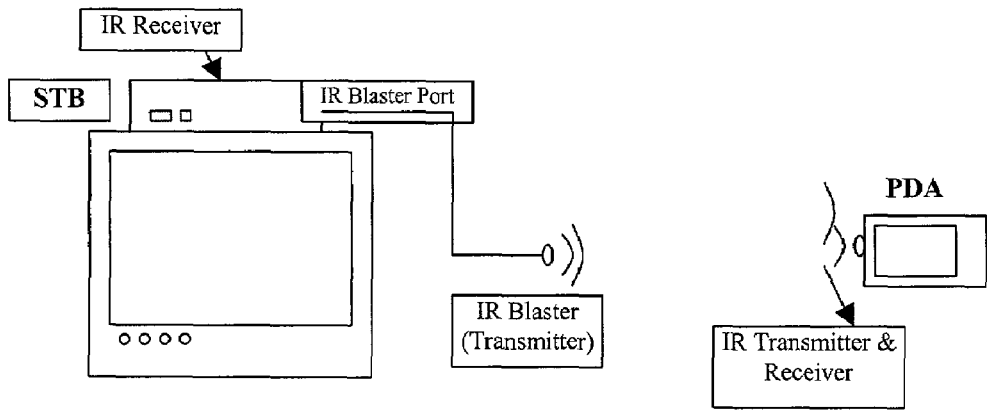
Figure 4B: RS-232 Serial Interface
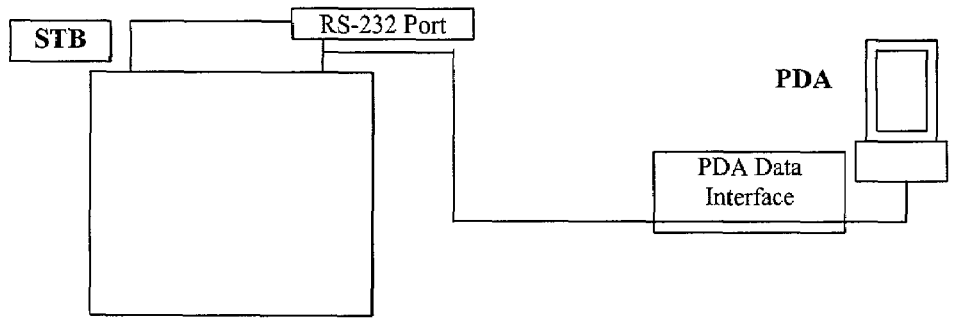
Figure 4C: Expansion Bus Interface
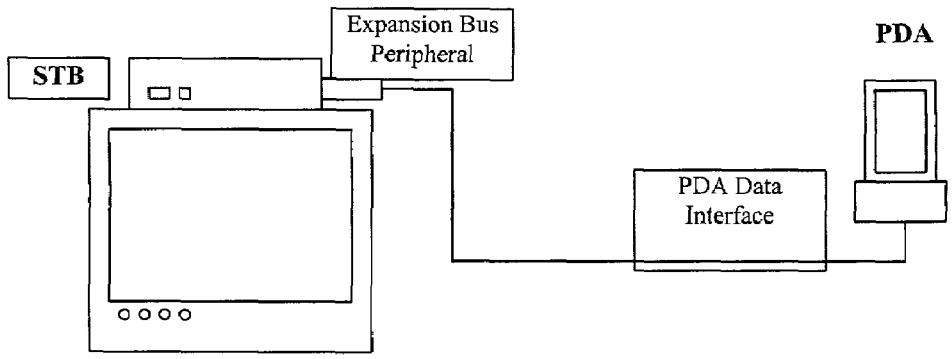

Figure 5: System Overview
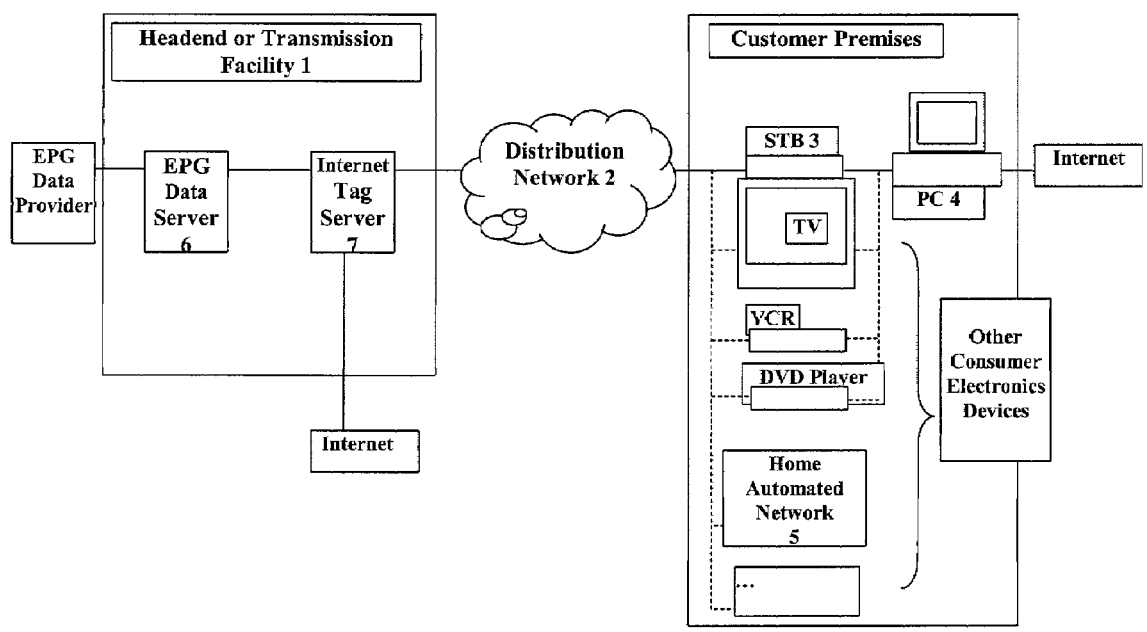

Figure 6A: IR Blaster to IR Receiver Interface
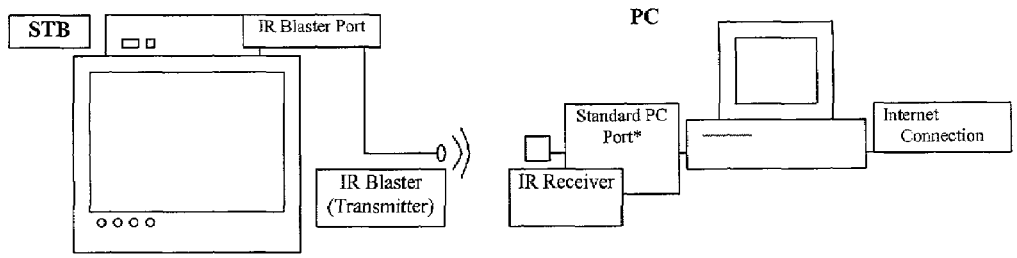
Figure 6B: Blaster Port Translator Interface
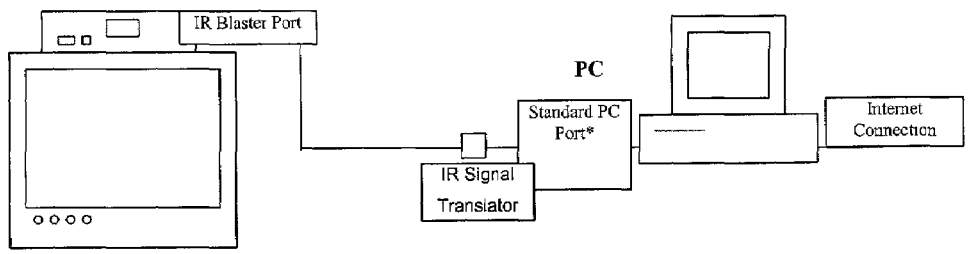
Figure 6C: RS-232 Serial Interface
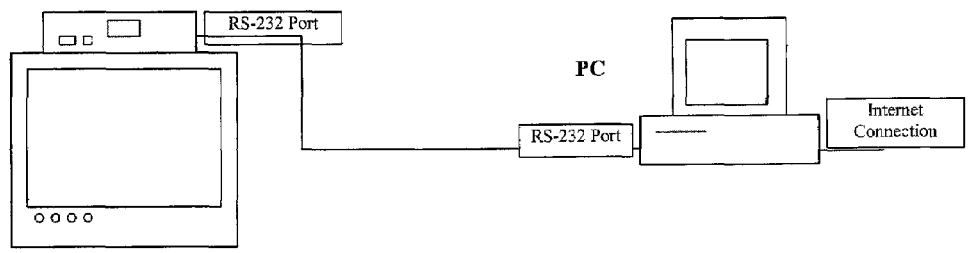
Figure 6D: Expansion Bus Interface
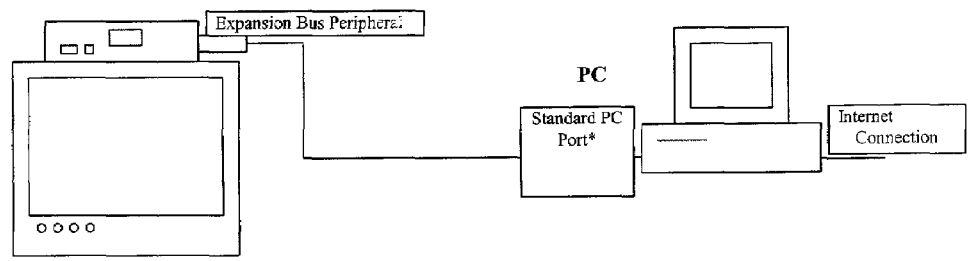

Figure 6E: Modem Interface
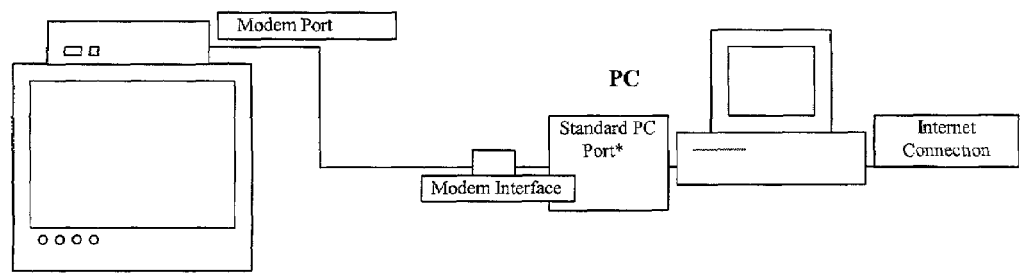
*Examples of a standard PC port include RS-232, USB, Centronics, SCSI, Firewire or Ethernet.

METHODS AND SYSTEMS FOR CONTROLLING CONSUMER ELECTRONICS EXTERNAL DEVICES VIA DATA DELIVERED TO A DEVICE

CROSS-REFERENCE TO RELATED APPLICATIONS

This application claims priority under U.S. law to provisional U.S. patent applications Ser. No. 60/213,058, filed Jun. 21, 2000; Ser. No. 60/214,529, filed Jun. 27, 2000; and Ser. No. 60/231,180, filed Sep. 7, 2000 each of which applications are owned by the assignee of this application and each of which applications are incorporated in its entirety by this reference.

TECHNICAL FIELD

This invention deals with methods and systems for delivering and executing at a Set Top Box ("STB") or other consumer electronic device, control or program data, whereby the STB interfaces with various external devices for sending or receiving instructions or information to those devices. Exemplary embodiments are illustrated, including methods and systems for supplementing delivered programming with Internet programming via a PC or Internet appliance coupled to the STB, controlling environmental equipment such as home theatre equipment, and managing programming scheduling via interface with a personal digital assistant ("PDA").

BACKGROUND OF INVENTION

Modern cable, satellite, wireless or other communications networks deliver a host of programming content and other data to viewers' premises, each of which generally is outfitted with a STB or Consumer Electronics device ("CE device") for decoding and displaying the programming. STBs are usually low-cost devices and, due to engineering constrains, presently lack the necessary processor speed, memory and components to support Internet applications or advanced data gathering capabilities. However, many STBs do have the capability to communicate with an external device through one of several communication mechanisms, such as an IR blaster, serial port, modem, or expansion bus peripheral. These communication devices have not in the past been used for much more than entering typical scheduling and control data into the STB, however.

Scheduling has been made easier because part of the programming delivered to STBs are Electronic Program Guides ("EPGs"). These guides provide a viewer with program scheduling information, e.g. a program's channel or other characteristics of the program such as whether the program supports particular protocols like Dolby AC-3 sound, etc. EPGs also can be used to accomplish other useful tasks, such as instructing a STB to tune to a program based on user preferences or instructing a VCR to record a program. Indeed, some EPGs offer the ability to create reminders for program start times. These reminders usually appear as visual alerts on the television screen when the program is about to begin. However, if the user is not watching television at the time these alerts occur, they are of little value.

SUMMARY OF THE INVENTION

Certain terms used in this section are described more fully below, particularly in the "Terminology" session. This invention aims to provide systems and methods to leverage existing technologies located at a viewer's premises, e.g., the viewer's PC, existing PC Internet connection, STB, and existing EPG data delivery format, to deliver, receive and act upon information and instructions for certain external devices. Exemplary implementations are described where: (1) an STB is connected to a viewer's PC and an application, residing on the STB, retrieves data from the PC using special tags embedded in EPG program data or accesses a host of special Internet related applications while viewing other programming; (2) an STB makes use of information added to or already included in EPG program data to control aspects of the user's home theater environment during a TV program; (3) an STB communicates with an application on a Personal Digital Assistant (PDA) to set reminders about programming, for example, start times, etc. or download program information to the PDA for storage and display, etc.

Program Supplementation: In one embodiment, control tags are inserted into the data stream that provides STBs with the EPG data. An application residing on the STB identifies the control tags, strips them out and processes the instructions therein. The instructions may cause the STB to communicate with a PC, Internet appliance or other computing device that has been coupled to the STB via any of various known communication mechanisms. The STB thereby can take advantage of the functionality, processing power and display capabilities of the computing device. Using this capability, an STB can supplement its limited capabilities by using the processing power of the PC and the information gathering ability of a PC connected to the Internet. By way of example, tags delivered to the STB may cause it to retrieve Internet data via the user's PC or Internet appliance. That Internet data can be used to supplement EPG data on the STB or display data synchronized to a currently playing event. Alternatively, retrieved Internet data may be stored on the PC for immediate or later viewing.

Environmental Control: In another embodiment, the tags embedded in the EPG data stream (or the programming itself) comprise certain control data that correlate to a particular program or event. The control data describes how the user's home theater equipment (e.g., stereo, wall-screen TV, thumpers, scent extractors, etc.) should be optimally controlled during the program presentation. Control data can be used to do such things as configure home audio equipment to best accommodate a program's soundtrack, adjust TV picture settings, automate room lighting, mute commercials, or even "censor" portions of a TV program.

PDA Interfacing: Many people now carry PDAs, which provide scheduling and task management capabilities. This invention also provides methods for allowing external devices like PDAs to interface with the STB in order to display alerts or other information concerning programming using the PDA unit's built-in calendar and alarm capabilities. Similarly, the PDA may be configured to send information to the STB application, for example, instructing it to set reminders for programs or to automatically record programs on a VCR, DVR or other storage medium.

This invention aims to achieve one, combinations, or all of the following objectives:

- To formulate program control data associated with discrete portions of programming, which contain information related to controlling presentation of the programming by controlling the manner in which various home theatre or other display and audio devices should be controlled;
- To provide an STB that receives and processes control data and communicates instructions therefrom to external devices coupled to the STB;
- To formulate control data that describes when and how to access supplemental program data, such as data from an Internet Website, via a user's PC, Internet appliance or other computing device;
- To provide methods for coupling an STB to a user's PC, Internet appliance or other computing device in order to exchange information and instructions.

Other objects, advantages and features of this invention will be apparent from review of the remainder of this document, including the drawings.

BRIEF DESCRIPTION OF DRAWINGS

FIGS. 2A–C are diagrams illustrating methods of connecting the STB to the home automated network described in FIG. 1.

FIGS. 4A–C are diagrams illustrating methods of connecting the STB to the PDA described in FIG. 3.

FIG. 5 is a diagram illustrating a networked control system, including a PC, according to the present invention.

FIGS. 6A–E are diagrams illustrating methods for connecting the STB to the PC described in FIG. 5.

DETAILED DESCRIPTION

Figure 1:
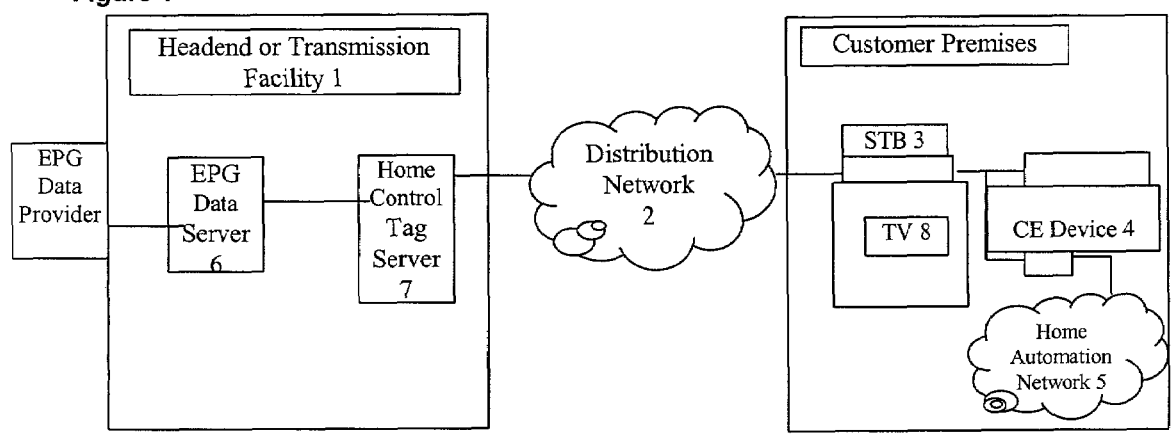
FIG. 1 is a diagram illustrating an embodiment of a system for controlling a home automated network using EPG tag information according to the present invention.

I. Terminology:

Before further describing a particular implementation of the present invention that is shown in the drawings, the following terms are explained, although more thorough understanding of the terms can be reached by resorting to this entire document. These term explanations are not intended to be conclusive, as technology will change and skilled persons will recognize other ways to implement the same functionality.

"Communications network" includes any network or infrastructure that supports communications between multiple devices, including broadband distribution networks, public or private packet-switched or other data networks, including the Internet, or circuit-switched networks such as the public switched telephone network and wireless networks.

"Consumer electronics device" or "CE device" is any electronic device or combination of devices capable of receiving, displaying, playing, presenting, recording, deleting, editing, substituting, or disabling audio and/or video content. Exemplary CE devices include: televisions, personal computers, cable set-top boxes, video cassette recorders, digital video recorders, digital video disc players, compact disc players, and personal computers.

"Content data" is any information corresponding to at least a portion of a program and related to the content of the program, including content ratings and content attributes, traits, or characteristics.

"Control data" is any information corresponding to at least a portion of a program and related to the manner in which the portion may be disabled, modified, replaced, deleted, edited, or otherwise modified by a consumer electronics device, set top box or the like.

"Program" or "Programming" is any electronic presentation of information, such as text, audio, video, graphics, or any other form of multimedia, over a communications network. Exemplary programming includes: Internet programming, television broadcasts, cable television programming, pay-per-view programming, video-on-demand, interactive television programming, satellite programming, and multimedia presentations.

"Program data" means content or control data or other data associated with or describing the content or manner of presentation of programming.

"Service provider" is any entity that delivers programs to a program viewer, including cable providers, television broadcasters, satellite providers, and entities supporting Internet World Wide Web ("Web") sites.

II. System Overview—EPG Environmental Control

Figure 3:
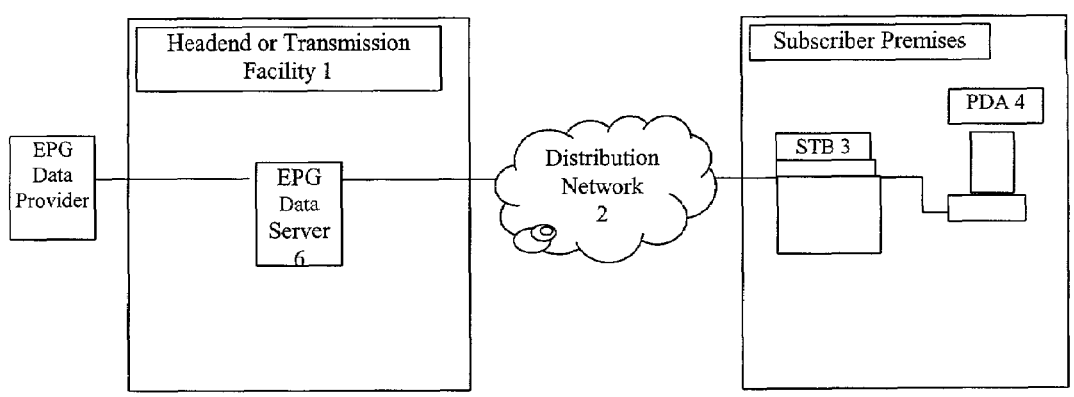
FIG. 3 is a diagram illustrating an embodiment of a system for facilitating communications between a STB and a PDA according to the present invention.

Briefly, FIGS. 1, 3 and 5 show system components for delivering data that controls various devices that assist in the optimal presentation of programming. In the subscriber's premises, a Set-Top Box 3 connects through a distribution network 2 to a headend 1. Set-Top Box 3 also connects to the subscriber's consumer electronic (CE) device 4, for example a VCR, stereo, computer, etc. and/or home automation network 5. The CE device 4 is in turn connected to the Internet through an Internet service provider. As skilled persons will acknowledge, instead of STB 3, the invention could be implemented using software and hardware associated with a CE Device, such as a TV 8.

A. STB—CE Device Connection

Set-Top Box 3 can be connected to CE device 4 and/or home automation network 5 through a variety of means. Some detailed examples are listed below. The hardware details of the STB-home theater connection are provided here for technical reference only and the invention is not limited to such details.

1) Using an IR blaster connected to the STB's IR blaster port, the STB may use IR signals to communicate with consumer electronic devices such as a stereo amplifier or a home automation network. (FIG. 2A)
2) Using the STB's serial port, the STB may connect to a peripheral that converts the RS-232 signals used by the STB into a standard signal used by CE devices and home automation networks. Such signals include signals in the IEEE 1394 (aka: Firewire) or CEBus (FIG. 2B) formats.
3) Using the STB's expansion bus, the STB could be connected to the peripheral described above, as shown in (FIG. 2C).

B. Data Tags

Headend 1 houses an EPG Data Server 6 that collects program data from a data provider. The program data includes information on each TV program such as the program title, start time, duration and description. EPG Data Server 6 sends the program data through distribution network 2 to Set-Top Box 3 located in the subscriber premises. Some of the applications listed in the next section may be accomplished by using information already contained within the EPG data, such as a program's start time and Dolby AC-3 indicator. However, specific control by the EPG must be carried out using special data referred to as "tags," which according to this invention are added to EPG program data to provide more detailed information on controlling the user's home theater environment. The tags instruct the STB application to send control information to specific CE devices and/or home automation networks during the course of a program. For instance, a tag may instruct the STB to configure a stereo amplifier, adjust the TV picture, and dim the lights at the start of a program. A tag may also indicate times at which commercials or possibly objectionable content occurred during a program and send instruction to a TV to mute or blank those portions of the program.

The tags may be added to the EPG data by the EPG data provider or could be added by an optional device in headend 1 referred to as the "Home Control Tag Server" 7. In this latter case, the EPG Data Server 6 sends the EPG data to the Home Control Tag Server 7, which in turn inserts special data referred to as "tags" into the program data for particular TV programs.

Tags may be classified as fixed or variable tags; "Fixed Tags" specify a parameter for the entire length of a program while "Variable Tags" vary a parameter at different times during a program. An example of a variable tag would be one that mutes TV commercials.

The tag would be encoded as a special ASCII string and could include the following elements:

1) Command. A command may be an instruction that an applet on the STB send control instructions to specific CE devices and/or a home automation network. For instance, the command could be "Switch Tuner to Dolby Surround Sound."
2) Parameters. Each command could have one or more parameters associated with it. For instance, "raise Dolby sound to level 5."
3) Start Offset and Duration. A command could have a start offset and duration associated with it to indicate when the command becomes active during the course of a program. (A negative start offset could be used to indicate that the command becomes active before a program begins.) More than one start offset and duration could be provided to make a command active during different portions of a program (e.g. mute commercials).

A detailed example of a possible tag format follows, although many different tag formats and instructions are possible:

<command [param1, param2, . . . ]>
-or-<
<OFFSET start1;duration1, [start2;duration2, start3;duration3 . . . ]>
　<command [param1, param2, . . . ]>
</OFFSET>

In this example,
"< >" indicates the beginning and end of a tag.
"Command" indicates an instruction to the STB application.
"Param" indicates a parameter associated with the command.
"OFFSET" and "/OFFSET" is used to indicate that the enclosed command(s) begin at some offset from the beginning of the program.

"Start" is the starting offset from the beginning of the program.
"Duration" is the length of time the command is valid from the specified "Start" offset. If Duration is not specified, the command remains in effect until the end of the program or until some other event occurs.

Here are some examples of how this tag format could be used to instruct the STB to configure home audio equipment and lighting for a Pay-Per-View event:
PPV Command: <LT1 50%><ST_VOL 20%><ST_EQU 80,50,60,65,70><ST_SUR AC3>

In the PPV Command:
"LT1", "ST_VOL", "ST_EQU", and "ST_SUR" are instructions to set room lighting, stereo volume, stereo equalization, and stereo surround sound, respectively when the program begins.
"50%", "20%", "80,50,60,60,70", and "AC3" are parameters used by each of the above instructions.
Block Command: <OFFSET 00:05:13; 5, 00:19:32; 20><BLOCK-MUTE PG-13></OFFSET>

In the Block Command:
"BLOCK-MUTE" is a command to mute objectionable portions of a program if the user has the option activated.
"PG-13" is the rating level the user's STB setting would have to match or exceed in order for the muting to take place.
"00:05:13; 5, 00:19:32; 20" are two different start offset and duration pairs, meaning that the command will be active at two different times during the program.

Tags may be inserted into a variety of places in the program data. A new data field could be created to accommodate the tags or the tags could be added to an existing EPG data field such as the program description. The latter option is optimal since it can use existing EPG data formats such as DVB-SI.

For instance, the tag could be encoded as an ASCII text string and added to the end of a program's description. The STB application would recognize the tag and act on its instructions. However, the STB application would not display the actual tag string to the subscriber when the subscriber displays the program description.

C. System Capabilities

Using the system described above, a number of control capabilities may be programmed into the EPG data allowing a broadcast provider to offer new and enhanced programming and supplemental products. In addition, users are able to optimize and enhance their television programming. For example, the user could have the ability to adjust, enable or disable any aspect of any application listed below. For instance, the user could disable automatic stereo control for all programs or make it active only for purchased IPPV programs. The following is a listing of some of the enhanced capabilities of the present invention:

Stereo Amplifier Control. The STB application may use existing EPG data or special tags embedded in the program data to adjust a stereo amplifier. For instance, existing EPG data such as a program's AC-3 indicator could be used by the STB application to put the stereo into AC-3 mode during a program. Special tags could be added to program data to do such things as adjust the stereo volume, stereo equalizer, or speaker levels. At the end of the program, stereo settings could be restored to their original or default settings.

TV Control. The STB application could use tags embedded in the program data to adjust different aspects of a television set. For instance, tags could adjust picture or sound settings to best accommodate a particular program. At the end of the program, picture or sound settings could be restored to their original or default settings.

Lighting Control. The STB application could use existing EPG data such as a program's start and end times or special tags embedded in the program data to control room lighting. For instance, room lights could be set to automatically dim at the start of a purchased IPPV program and then brighten at the end of the program. Also, special tags could instruct the STB application to brighten room lights during TV commercials, allowing the user to find their way to the kitchen.

Other Home Automation Control. The STB application could use existing EPG data such as a program's start and end times or special tags embedded in the program data to control other parts of a home automation network. For example, at the start of a program, the STB application could automatically mute a telephone ringer, adjust window shades, adjust room temperature, or activate a popcorn popper.

Commercial Mute/Replace. The STB application could use tags embedded in the program data to mute volume, or tune to a special channel or video input during TV commercials.

Dynamic Parental Controls. The STB application could use tags embedded in the program data to mute or blank portions of a program that exceed a certain parental control rating.

On-Screen Graphics and PIP Display. The STB application could use tags embedded in the program data to enable or disable on-screen displays generated by the STB or some other consumer electronics device. Also, tags could be used to automatically enable, disable or configure a Picture-in-Picture (PIP) display.

Motion Simulator. The STB application could use tags embedded in the program data to control a motion simulator or a feedback device such as a chair that vibrates.

Aroma Generator. The STB application could use tags embedded in the program data to control an aroma generator. The aroma generator could generate aromas that correspond to the content of a program.

III. System Overview—PDA Reminder Exchange

FIG. 3 shows system components for connecting the STB to a PDA. In the subscriber's premises, a Set-Top Box 3 is connected through a distribution network 2 to a Headend or Transmission Facility 1. Set-Top Box 3 is also connected to the subscriber's Personal Digital Assistant (PDA) 4. An EPG Data Server 6 in the Headend or Transmission Facility 1 provides Set-Top Box 3 with program information on each TV program such as program title, start time, duration and description.

A. STB—PDA Connection

Set-Top Box 3 can be connected to a Personal Digital Assistant 4 through a variety of means. Some detailed examples are listed below. Note that the hardware details of the STB-PDA connection are not the main focus of this invention, which may be implemented over a number of platforms.

1) Using an IR blaster connected to the STB's IR blaster port, the STB could send IR signals to a PDA with a built-in IR receiver. Also, the PDA's built-in IR transmitter could be used to send IR signals to the existing IR receiver on the STB for two-way communications. (FIG. 4A)

2) Using the STB's serial port, the STB could be connected to a data communications port on the PDA. This means of communication would offer two-way data transmission. (FIG. 4B)

3) Using a peripheral connected to the STB's expansion bus (e.g. an Ethernet card), the STB could be connected to a data communications port on the PDA. This means of communication would offer two-way data transmission. (FIG. 4C)

B. System Capabilities

A STB application such as an Electronic Program Guide (EPG) would be enhanced to send and receive information to and from a PDA using the system described above. In this embodiment, the following applications could be supported.

1) Set PDA Reminders. While watching television, the user sets reminders for current or future programming using the enhanced EPG application running on the STB. After program reminders are set, the user positions the PDA in front of the STB's IR blaster (or connects the PDA to the STB via some other hardware configuration, as shown in FIGS. 4A–C, and the enhanced EPG application communicates these reminders to a special application residing on the PDA. The special PDA application adds the program reminder as an entry in the PDA's built-in calendar application. It also configures the calendar application to notify the user with a visual and/or audible alarm before the start of the program. Of course, instead of using the PDA's built-in calendar application, the special PDA application may be designed to perform these functions on its own.

2) Display EPG Info from the STB on the PDA. The enhanced EPG application residing on the STB sends EPG program data to software residing on the PDA for storage and display.

3) Schedule EPG Reminders or Recordings. After EPG program data has been sent to the PDA, the user sets program reminders and/or schedules program recordings on software residing on the PDA. At some point later in time, the PDA transmits the settings to the enhanced EPG application residing on the STB, which in turn sets program reminders and schedules program recordings within the EPG application.

IV. System Overview—PC InterLink

Briefly, FIG. 5 shows a variety of system components for connecting and communicating between a STB and a PC. In the subscriber's premises, Set-Top Box 3 is connected through distribution network 2 to Headend or Transmission Facility 1. Set-Top Box 3 is also connected to the subscriber's Personal Computer (PC) 4. PC 4 is connected to the Internet through an Internet service provider. Of course, instead of STB 3, the invention could be implemented using software and hardware associated with some other CE Device such as a TV, VCR, or DVD Player.

A. STB—PC Connection

Set-Top Box 3 can be connected to Personal Computer 4, in FIG. 5, through a variety of means. Some detailed examples are listed below.

1) Using the IR blaster port, the STB could communicate with a PC using one of the following two means. These means of communication offer only one-way data transmission at slow speeds.

(a) An IR blaster connected to the STB's IR blaster port could send IR signals to an IR receiver peripheral connected to a standard port on a PC. (FIG. 6A)

(b) The STB's IR blaster port could send electrical signals directly to a peripheral connected to a standard port on a PC. The peripheral would translate the electrical signals sent out via the STB's IR blaster port into signals understood by one of the PC's standard ports. (FIG. 6B)

2) Using the STB's serial port, the STB could be connected to the PC's serial port. This means of communication would offer two-way data transmission at moderate speeds. (FIG. 6C)

3) Using a peripheral connected to the STB's expansion bus (e.g. an Ethernet card), the STB could be connected to a standard port on a PC. This means of communication would offer two-way data transmission. (FIG. 6D)

4) Using the STB's modem phone port, the STB could communicate with a modem connected to the PC. This means of communication would offer two-way data transmission. (FIG. 6E)

B. Data Tags

Referring to FIG. 5, Headend or Transmission Facility 1 houses an EPG Data Server 6 that collects program data from a data provider. The program data includes information on each TV program such as the program title, start time, duration and description. The EPG Data Server sends the program data to an "Internet Tag Server" 7 that inserts special data referred to as "tags" into the program data for particular TV programs.

The tags act as instructions to a STB application to retrieve Internet data from a PC. Before retrieving this data, the tag could include instructions for presenting the subscriber with different data retrieval options. For instance, a tag in the program data for a baseball game could instruct the STB to display options on the TV screen called "Batter Statistics" and "Pitcher Statistics." If the subscriber selects the "Batter Statistics" option, the tag instructs the STB to retrieve statistics on the current batter from a PC connected to the Internet and display them on the TV screen.

A tag may include the following elements:

1) Command. A tag would include a command such as "fetch Internet data from a PC" or "display a menu of data retrieval options to the subscriber." Also, in addition to retrieving Internet data, commands could do other things such as "bookmark a web site on the subscriber's PC." See the "System Capabilities" section below for further examples.

2) Command URL. A command could have a URL associated with it. The URL could be a normal Internet URL such as "www.bellsouth.com" or, to save memory, the URL could be represented in some shorthand notation, e.g. "wbis", understood by the STB or PC applications.

3) Command Parameters. A tag command could have one or more parameters associated with it. For example, the command to display a menu of data retrieval options to the subscriber could have a parameter that indicates the format that the menu options are to be displayed in. Another parameter might indicate when the menu should be displayed. For instance, a menu could be displayed while the subscriber is watching the TV program or when the subscriber calls up EPG information on the program.

4) Menu Option Names. A tag could list the names of menu options to be displayed to the subscriber.

5) Menu Option Actions. A tag could include instructions on what to do if the subscriber selects a particular menu option. For instance, an action might be to retrieve and display a specific type of data from an Internet site.

6) Menu Option Parameters. A tag could include parameters for a menu option. For instance, a parameter could instruct the STB application on how to display results when a menu option is selected.

A detailed example of a possible tag format follows, although many different tag formats and instructions are possible.

<command URL [param1, param2, . . . ]>
    [<menuoption1 action1 [param1,param2, . . . ]>,
    <menuoption2 action2 [param1,param2, . . . ]>
    . . .
</command>]

Here is an example of how the tag format could be used to present the subscriber with menu options and retrieve supplemental EPG data for the movie "The Matrix". The following represents an embedded command for that movie:

<DISPMENU wbls/matrix descript,buttons1>
    <"Director Bio" DispData=director box1>
    <"Cast Notes" DispData=cast box1>
</DISPMENU>

In this example,

"DISPMENU" is a command to display menu options for the program

"wbls/matrix" is shorthand notation for a special web URL setup to provide data for the program. In this example, "wbis/matrix" is shorthand notation for the web URL "www.bellsouthmovies.com/matrix".

"descript,buttons1" are command parameters. In this example, "descript" indicates that the menu should be displayed when the subscriber calls up the program's description box, and "buttons1" indicates a standard format in which to display the menu options.

"Director Bio" and "Cast Notes" are the names of the menu options to display to the subscriber.

"DispData=director" and "DispData=cast" are the actions the STB application should take when the subscriber selects the menu options. In these cases, the STB application will retrieve data on the director or cast notes from the web URL "wbls/matrix" ("www.bellsouthmovies.com/matrix").

"box1" indicates the format in which to display the resulting data.

Tags can be inserted into a variety of places in the program data. A new data field could be created to accommodate the tags or the tags could be added to an existing EPG data field such as the program description. The latter option is optimal since it can use existing EPG data formats such as DVB-SI. For instance, the tag could be encoded as an ASCII text string and added to the end of a program's description. The STB application would recognize the tag and act on its instructions. However, the STB application would not display the actual tag string to the subscriber when the subscriber displays the program description.

C. System Capabilities

Using the system described above, the following capabilities could be supported:

1) Supplemental program information. Existing EPG data for a current or future event is supplemented by data retrieved from a PC attached to the Internet. The additional data can be displayed on the TV screen as part of the EPG data or displayed on the PC screen in a special window. Multiple options may be presented.

For example, the STB application may display a menu giving the subscriber the ability to retrieve data on a show's cast or call up trivia on the particular episode.

2) Real-time data. Data is synchronized to a currently playing event. For instance, current pitcher and batter statistics could be provided during a baseball game. The STB application could present a menu in the bottom corner of the screen allowing the subscriber to display statistics on either the pitcher or batter. If the subscriber selects an option, the STB application requests the information from the PC. The PC, in turn, visits a special web site that provides data that is specially formatted and synchronized to a TV channel being viewed. The statistics on the current pitcher or batter are then displayed in a window (e.g., a picture in picture or PIP window) on the TV screen.

3) PC browsing. The STB application allows the subscriber to display related data on a current or future event on the subscriber's PC. The data could be displayed on the PC in several different ways. For instance, the data could be part of a web page that is automatically called up in a web browser such as Netscape. The data could also be stored on the PC for later viewing.

4) Automated bookmarks. Instead of going ahead and displaying a related web page on the PC, the STB application could instruct the PC to store a web page as a bookmark for later viewing.

5) Purchasing. The STB application allows the subscriber to purchase products related to a current or future event over the Internet. While the STB application would initiate the purchase, the complete purchase process could take place on the STB or the PC.

6) Calendar reminder. The STB application could instruct the PC to add the name and start time of an event to a calendar application on the PC. The calendar application would alert the subscriber to when an event begins. The calendar application could interface with a personal digital assistant such as a Palm Pilot, etc. by downloading information when the PDA is synchronized with the calendar function on the PC.

7) Printing. The STB application could send event information to a PC and instruct the PC to print the event information on a printer.

8) Screen capture. The STB application could send a screen capture to the PC for use in a variety of PC applications.

9) Bill review. The STB application could instruct the PC to retrieve the subscriber's billing information from the Internet for display on the TV or PC.

10) Interactive help. The STB application could instruct the PC to retrieve interactive help from the Internet for display on the TV or PC.

While this invention has been described in conjunction with specific embodiments, it is evident that many alternatives, modifications, and variations will be apparent to those skilled in the art. Accordingly, the preferred embodiments of the present invention that are here described are intended to be illustrative and not limiting. Various changes may be made without departing from the true spirit and full scope of the invention as defined in the following claims.

What is claimed is:

1. A method of distributing tagged programming, the method comprising:
receiving programming;
receiving a data tag with Electronic Programming Guide data, the data tag comprising control data relating to the programming, the data tag added to an end of a program description field in the Electronic Programming Guide data, the data tag comprises a command to mute a ringer on a telephony device;
stripping the data tag from the Electronic Programming Guide data; and
communicating the control data to a consumer electronics device.

2. The method of claim 1, wherein the data tag comprises an ASCII character that prevents display of the data tag in the program description field.

3. The method of claim 1, wherein the data tag comprises a command to add a reminder to a calendar application.

4. The method of claim 1, wherein the data tag comprises a command to add a reminder to an external calendar application.

5. The method of claim 1, wherein the data tag begins and ends with a predetermined ASCII character.

6. The method of claim 1, wherein the data tag comprises a command and a start offset, the start offset having a negative value to indicate the command becomes active before a start time for the program.

7. The method of claim 1, wherein the data tag comprises a single entry having a command with multiple pairs of a start offset and a duration, with each paired start offset and duration identifying commercial programming, and the command muting the commercial programming.

8. The method of claim 1, wherein the data tag comprises a command to mute programming that exceeds a parental control rating.

9. The method of claim 1, further comprising setting a reminder for a calendar application.

10. The method of claim 1, further comprising receiving a reminder for a calendar application.

11. A method of receiving tagged programming, comprising:
receiving electronic program guide data;
receiving a data tag that has been added to an end of a program description in the electronic program guide data, the data tag comprising a command and a parameter to mute a ringer on a telephony device;
stripping the data tag from the electronic program guide data; and
communicating the command and the parameter to a consumer electronics device.

12. The method of claim 11, wherein receiving the data tag comprises receiving an ASCII character that prevents display of the data tag in the electronic program guide data.

13. The method of claim 11, wherein the step of receiving the data tag comprises receiving a reminder for a calendar application.

14. The method of claim 11, wherein the step of receiving the data tag comprises receiving a predetermined ASCII character that indicates a beginning and an end of the data tag.

15. The method of claim 11, wherein the step of receiving the data tag comprises receiving a command and a start offset, the start offset having a negative value to indicate the command becomes active before a start time for a program.

16. The method of claim 11, wherein the step of receiving the data tag comprises receiving a single entry having a command with multiple pairs of a start offset and a duration, with each paired start offset and duration identifying commercial programming, and the command muting the commercial programming.

17. The method of claim 11, wherein the step of receiving the data tag comprises receiving a command to mute programming that exceeds a parental control rating.

18. The method of claim 11, wherein the step of receiving the data tag comprises receiving a command to add a reminder to an external calendar application.

19. The method of claim 11, further comprising setting a reminder for a calendar application and communicating the reminder to the consumer electronics device.

20. The method of claim 11, further comprising communicating the electronic program guide data to the consumer electronics device.

* * * * *